(12) United States Patent
Park et al.

(10) Patent No.: US 8,855,002 B2
(45) Date of Patent: Oct. 7, 2014

(54) CHANNEL INFORMATION FEEDBACK DEVICE AND METHOD THEREOF, AND MODE SWITCHING METHOD, COMMUNICATION TERMINAL DEVICE, AND BASE STATION SYSTEM USING SAME

(75) Inventors: Kyoungmin Park, Goyang-si (KR); Sungjin Suh, Seoul (KR)

(73) Assignee: Pantech Co., Ltd., Seoul (KR)

( * ) Notice: Subject to any disclaimer, the term of this patent is extended or adjusted under 35 U.S.C. 154(b) by 337 days.

(21) Appl. No.: 13/505,637

(22) PCT Filed: Nov. 2, 2010

(86) PCT No.: PCT/KR2010/007635
§ 371 (c)(1),
(2), (4) Date: May 2, 2012

(87) PCT Pub. No.: WO2011/053084
PCT Pub. Date: May 5, 2011

(65) Prior Publication Data
US 2012/0218913 A1  Aug. 30, 2012

(30) Foreign Application Priority Data

Nov. 2, 2009  (KR) ........................ 10-2009-0105207

(51) Int. Cl.
| | |
|---|---|
| *H04W 72/04* | (2009.01) |
| *H04B 7/06* | (2006.01) |
| *H04W 24/10* | (2009.01) |
| *H04L 1/00* | (2006.01) |
| *H04L 25/02* | (2006.01) |
| *H04W 28/04* | (2009.01) |
| *H04B 7/02* | (2006.01) |

(52) U.S. Cl.
CPC ............ *H04B 7/0639* (2013.01); *H04B 7/0632* (2013.01); *H04L 25/0224* (2013.01); *H04W 28/048* (2013.01); *H04L 25/0212* (2013.01); *H04B 7/024* (2013.01); *H04W 24/10* (2013.01); *H04L 1/0026* (2013.01)
USPC ............................ 370/252; 370/328; 370/329

(58) Field of Classification Search
CPC ................. H04W 72/04; H04W 24/10; H04L 25/03343; H04L 1/0026; H04L 25/0212; H04B 7/0456; H04B 7/0417; H04B 7/0626; H04B 7/0632; H04B 7/024; H04B 7/0639
USPC ........................... 370/252–329; 375/227, 267
See application file for complete search history.

(56) References Cited

U.S. PATENT DOCUMENTS

| | | | |
|---|---|---|---|
| 7,778,217 B2 | 8/2010 | Lee et al. | |
| 2008/0227448 A1 | 9/2008 | Kim et al. | |
| 2008/0287138 A1 | 11/2008 | Yoon et al. | |

(Continued)

FOREIGN PATENT DOCUMENTS

| | | | | |
|---|---|---|---|---|
| KR | 10-2005-0078636 | * | 8/2005 | ............ H04W 24/10 |
| KR | 1020050078636 | | 8/2005 | |

(Continued)

OTHER PUBLICATIONS

International Search Report of PCT/KR2010/007635 dated Jul. 20, 2011.

*Primary Examiner* — Afsar M Qureshi
(74) *Attorney, Agent, or Firm* — H.C. Park & Associates, PLC

(57) ABSTRACT

The present invention relates to a wireless communication system, and more particularly to a device for feeding back channel information in consideration of interference according to connection of an additional terminal and a technique for switching a mode by enabling a base station and the like to determine the connection of the additional terminal using the communication system.

13 Claims, 5 Drawing Sheets

(56) References Cited

U.S. PATENT DOCUMENTS

| | | | |
|---|---|---|---|
| 2009/0190687 A1* | 7/2009 | Moon et al. | 375/267 |
| 2012/0021688 A1* | 1/2012 | Bhattad et al. | 455/63.1 |
| 2012/0057482 A1* | 3/2012 | Geirhofer et al. | 370/252 |
| 2013/0128820 A1* | 5/2013 | Yuan et al. | 370/329 |
| 2013/0310099 A1* | 11/2013 | van Rensburg et al. | 455/509 |

FOREIGN PATENT DOCUMENTS

| | | |
|---|---|---|
| KR | 1020070011171 | 1/2007 |
| KR | 1020080083939 | 9/2008 |

* cited by examiner

CHANNEL INFORMATION FEEDBACK DEVICE AND METHOD THEREOF, AND MODE SWITCHING METHOD, COMMUNICATION TERMINAL DEVICE, AND BASE STATION SYSTEM USING SAME

CROSS REFERENCE TO RELATED APPLICATIONS

This application is the National Stage Entry of International Application PCT/KR2010/007635, filed on Nov. 2, 2010, and claims priority from and the benefit of Korean Patent Application No. 10-2009-0105207, filed on Nov. 2, 2009, both of which are to incorporated herein by reference for all purposes as if fully set forth herein.

BACKGROUND

1. Field

The present invention relates to a wireless communication system, and more particularly to an apparatus for feeding back channel information considering interference according to an access of a additional terminal and a technology for switching between a Single User-Multiple Input Multiple Output (SU-MIMO) mode allowing an access of a single User Equipment (hereinafter, referred to as a "UE") and a Multiple User-Multiple Input Multiple Output (MU-MIMO) mode allowing accesses of multiple users at the same time by using the apparatus.

2. Discussion of the Background

With the development of a communication system, consumers such as enterprises and individuals have used highly various wireless terminals.

In current mobile communication systems such as current 3GPP, LTE (Long Term Evolution), and LTE-A (LTE Advanced), it is required to develop a technology, which can transmit high capacity data, equivalent to a wired communication network as a high speed and capacity communication system, which can transmit and receive various data such as image, radio data, etc. beyond services mainly for voice. Further, it is necessary for such a technology to have a proper error detecting method, which can minimize an information loss and increase a system efficiency thereby improving a system capability.

Meanwhile, both transmitting and receiving sides adopt a communication system using MIMO (multiple-Input Multiple-Output) antennas, and the communication system has a structure in which a Single UE (SU) or Multiple UEs (MU) share the same capacity of radio resources and receive or transmit a signal from or to one base station.

Meanwhile, a communication scheme such as 3GPP requires a process of grasping a channel state by using several reference signals and feeding back the grasped channel state to another device.

That is, when one UE is allocated a plurality of downlink physical channels, the UE may feedback channel state information for each physical channel to a base station to adaptively optimize a system. To this end, a Channel Status Index-Reference Signal (CSI-RS), a is Channel Quality Indicator (CQI) signal, and a Precoding Matrix Index (PMI) signal may be used. The base station can use the channel state related information to schedule a channel.

Meanwhile, when another UE attempts an access in an SU-MIMO environment, the SU-MIMO does not consider interference which all UEs including a currently accessed UE and the UE to be accessed will experience due to the UE attempting the access. Accordingly, the UE cannot receive the support of appropriate performance when a system converts the SU-MIMO mode to the MU-MIMO or the system is operated in the MU-MIMO.

That is, the switching from the SU-MIMO mode to the MU-MIMO mode causes the existing UE to have performance deterioration due to the interference generated by the newly accessed UE, and also causes the newly accessed UE to have communication performance deterioration due to the interference between the existing UE and the newly accessed UE.

SUMMARY

An aspect of the present invention is to transfer information on all interference between UEs to a BS for efficient MU-MEMO support.

An aspect of the present invention is to determine a degree of interference with an existing UE and transfer an amount of interference or information on whether an MU-MIMO access is possible in advance to the BS based on the determined degree of interference when each UE attempts an access.

Another aspect of the present invention is to provide an operation which the UE should perform to reduce or avoid inter-UE interference, feedback information to be transferred to the BS, and a feedback method in a communication system supporting both the SU-MEMO and the MU-MIMO.

In accordance with an aspect of the present invention, there is provided an apparatus for feeding back channel information to a Base Station (BS) connected to one or more User Equipments (UEs), the apparatus generating and feeding back channel state information considering inter-UE interference due to an access of an additional UE.

According to another aspect of the present invention, there is provided a BS apparatus for switching a mode according to an access of an additional UE in a state where the BS apparatus is connected to one or more pre-accessed UEs, the BS apparatus receiving a feedback of channel state information according to the access of the additional UE from the pre-accessed UE or the additional UE, determining whether the additional UE is accessible based on the received feedback of the channel state information, and performing a mode switching operation according to the determination.

A communication terminal apparatus for feeding back channel information to a BS, the communication terminal apparatus generating and feeding back channel state information considering inter-UE interference according to an access of an additional UE.

According to another aspect of the present invention, there is provided a communication terminal apparatus for feeding back channel information to a BS, the communication terminal apparatus generating and feeding back channel state information considering inter-UE interference according to an access of an additional UE.

According to another aspect of the present invention, there is provided a method of feeding back channel information to a BS connected to one or more UEs, the method including acquiring a basic CQI/PMI value corresponding to a CQI in a current state without an access of an additional UE; acquiring an interference-reflecting CQI/PMI value corresponding to a CQI in a case where there is the access of the additional UE; and transmitting the acquired basic CQI/PMI value and interference-reflecting CQI/PMI value to the BS.

According to another aspect of the present invention, there is provided a method of feeding back channel information to a BS connected to one or more UEs, the method including acquiring a basic CQI/PMI value corresponding to a CQI in a current state without an access of an additional UE; acquiring an interference-reflecting CQI/PMI value corresponding to a CQI in a case where there is the access of the additional UE; and feeding back an MUI of an accessible flag and the interference-reflecting CQI value when a required CQI corresponding to a minimum requirement for a currently accessed UE or a UE to be additionally accessed is set and the interference-reflecting CQI value is larger than a required CQI value, and feeding back an MUI of an inaccessible flag and the basic CQI value when the interference-reflecting CQI value is smaller than a required CQI value.

According to another aspect of the present invention, there is provided a method of feeding back channel information to a BS connected to one or more UEs, the method including acquiring a basic CQI/PMI value corresponding to a CQI in a current state without an access of an additional UE; acquiring an interference-reflecting CQI/PMI value corresponding to a CQI in a case where there is the access of the additional UE; and determining whether a difference between the basic CQI value and the interference-reflecting CQI value is equal to or larger than a predetermined threshold (Th), and feeding back the basic CQI value when the difference between the basic CQI value and the interference-reflecting CQI value is larger than the threshold and feeding back the interference-reflecting CQI value when the difference between the basic CQI value and the interference-reflecting CQI value is smaller than the threshold.

According to another aspect of the present invention, there is provided a method of switching a mode according to an access of an additional UE in a state where there are is accesses of one or more pre-accessed UEs, the method including receiving a feedback of channel state information according to the access of the additional UE from the pre-accessed UE or the additional UE; and determining whether the additional UE is accessible based on the received feedback of the channel state information and performing a mode switching operation according to the determination.

DETAILED DESCRIPTION OF THE ILLUSTRATED EMBODIMENTS

Figure 1:
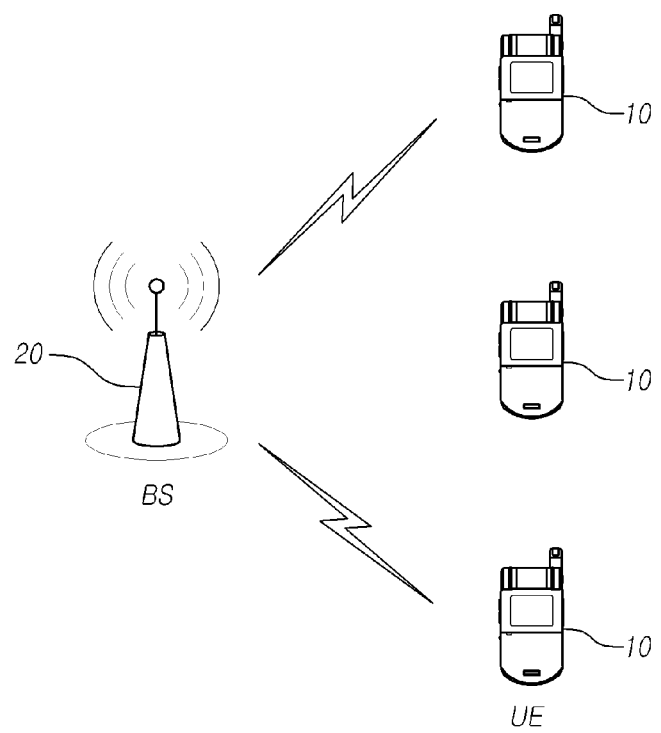
FIG. 1 schematically illustrates a wireless communication system to which an embodiment of the present invention is applied.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 illustrates a wireless communication system to which embodiments of the present invention are applied.

The wireless communication system is widely arranged to provide various communication services such as voice, packet data, etc.

Referring to FIG. 1, the wireless communication system includes a User Equipment (UE) 10 and a Base Station (BS) 20. The UE 10 and the BS 20 use a DM-RS mapping method which will be described in the following embodiment.

The UE 10 in this specification is a generic concept indicating a user terminal in wireless communication, and should be interpreted as a concept including all of a MS (Mobile Station), a UT (User Terminal), a SS (Subscriber Station), a wireless device, etc. in a GSM as well as a UE (User Equipment) in a WCDMA, a LTE, an HSPA, etc.

The BS 20 or a cell generally refers to a fixed station communicating with the to UE 10, and may be referred to as other terms such as a Node-B, an eNB (evolved Node-B), a BTS (Base Transceiver System), an access point, a relay node, etc.

That is, in this specification, the BS 20 or the cell should be interpreted as a generic concept indicating some areas covered by a BSC (Base Station Controller) in a CDMA and a Node-B in a WCDMA, and is a concept including various coverage areas such as communication ranges of a mega cell, a macro cell, a micro cell, a pico cell, a femto cell, and a relay node.

The UE 10 and the BS 20 in this specification are used as a generic meaning, which are transmitting/receiving subjects used to implement a technology or a technological idea described in the present disclosure, and they are not limited by a specifically designated term or word.

A multiple access scheme applied to a wireless communication system has no limitation, and the wireless communication system can use various multiple access schemes such as a CDMA (Code Division Multiple Access), a TDMA (Time Division Multiple Access), an FDMA (Frequency Division Multiple Access), an OFDMA (Orthogonal Frequency Division Multiple Access), an OFDM-FDMA, an OFDM-TDMA, and an OFDM-CDMA.

A TDD (Time Division Duplex) scheme corresponding to a transmission using different times may be used for an uplink transmission and a downlink transmission, or an FDD (Frequency Division Duplex) scheme corresponding to a transmission using different frequencies may be used for an uplink transmission and a downlink transmission.

An embodiment of the present invention may be applied to resource allocations of an asynchronous wireless communication field evolving into an LTE (Long Term Evolution) and an LTE-advanced via a GSM, a WCDMA, and an HSPA, and a synchronous wireless communication field evolving into a CDMA, a CDMA-2000, and a UMB. The present invention should not be interpreted as a limited and restricted concept to a specific wireless communication field, but should be interpreted as a concept including all technical fields, to which ideas of the present invention can be applied.

A communication system to which embodiments of the present invention are applied can support uplink and/or downlink HARQ, and can use a CQI (Channel Quality indicator) for a link adaptation. Further, multiple access methods for a downlink transmission and an uplink transmission may be different from each other, for example, the downlink may use an OFDMA (Orthogonal Frequency Division Multiple Access) and the uplink may use an SC-FDMA (Single Carrier-Frequency Division Multiple Access).

Layers of a radio interface protocol between a UE and a network may be divided into a first layer (L1), a second layer (L2), and a third layer (L3) based on three lower layers of an Open System Interconnection (OSI) model widely known in a communication system. A physical layer included in the first layer provides an information transfer service using a physical channel.

Figure 2:
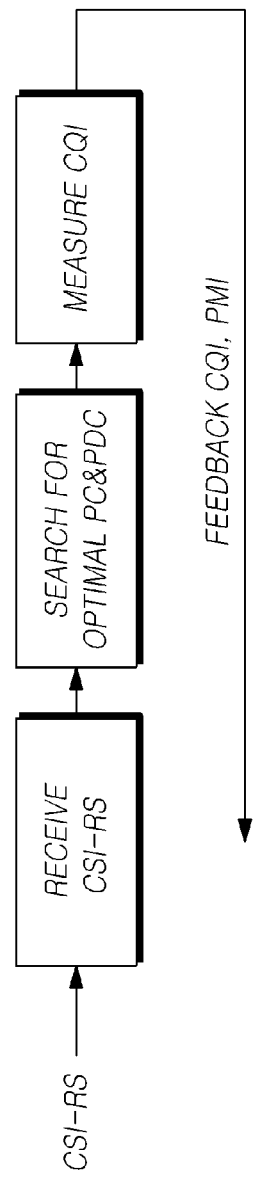
FIG. 2 illustrates a channel information feedback operation process of a UE in an MIMO system supporting an SU-MIMO.

FIG. 2 illustrates a channel information feedback operation process of the UE in an MIMO system supporting an SU-MIMO.

A CSI-RS refers to a reference signal, which the BS transmits to enable the UE to estimate a downlink channel, a CQI (Channel Quality Indicator) refers to an uplink sub channel, which measures a radio channel quality through a mobile terminal in a portable internet, an HSDPA scheme and the like, and aperiodically or periodically transfers channel quality information to the BS, and a Precoding Matrix Index (hereinafter, referred to as a "PMI") refers to an identifier for indicating an optimal precoding matrix to be used by the UE.

The UE estimates a channel by receiving the CSI-RS, and searches for a precoding (hereinafter, referred to as a "precoding" or a "PC") scheme and a post-decoding (hereinafter, referred to as a "post-decoding" or a "PDC") scheme most suitable for the estimated channel.

Then, the UE estimates a channel quality, which can be obtained through the above process, transfers information on a precoder, which is determined as a most suitable precoder, to the BS by using the PMI, and transfers a channel quality, which is determined to be obtained, by using the CQI.

Meanwhile, when all UEs accessing one BS shown in FIG. 1 operate in the way as shown in FIG. 2, the BS can grasp only a channel state of each UE, and cannot acquire information on interference which each UE will experience in a Multiple User-Multiple Input Multiple Output (MU-MIMO) environment.

Accordingly, a proper performance cannot be supported to the UE when a system is switched from a Single User-Multiple Input Multiple Output (SU-MIMO) to the MU-MIMO or is operated in the MU-MIMO scheme.

That is, when the CQI and the PMIT are generated and transmitted to the BS in the same way as a rank 1 feedback of the SU-MIMO, another information piece related to interference of the same channel generated by another UE scheduling together with the UE in the BS cannot be transmitted. Accordingly, the CQI, etc. transmitted by the corresponding UE cannot reflect an inter-UE interference state and thus a difference from an actual channel environment may be generated.

According to a structure as shown in FIG. 2, the switching from the SU-MIMO to the MU-MIMO causes the conventionally accessed UE to have interference due to a newly accessed UE, so that the performance of the conventional UE is deteriorated. Further, the performance of the newly accessed UE is deteriorated due to interference between the conventional UE and the newly accessed UE.

Therefore, a method, which can transfer information on inter-UE interference to the BS, should be considered for the efficient MU-MIMO support. In order to solve the above problem, an embodiment of the present invention adopts a configuration of searching for an optimal precoder and post-decoder in consideration of Demodulation Reference Signal (hereinafter, referred to as a "DM-RS") of another accessed terminal as well as a cell-specific CSI-RS and then feeding back a CQI, a PMI, etc. reflecting inter-UE interference.

Figure 3:
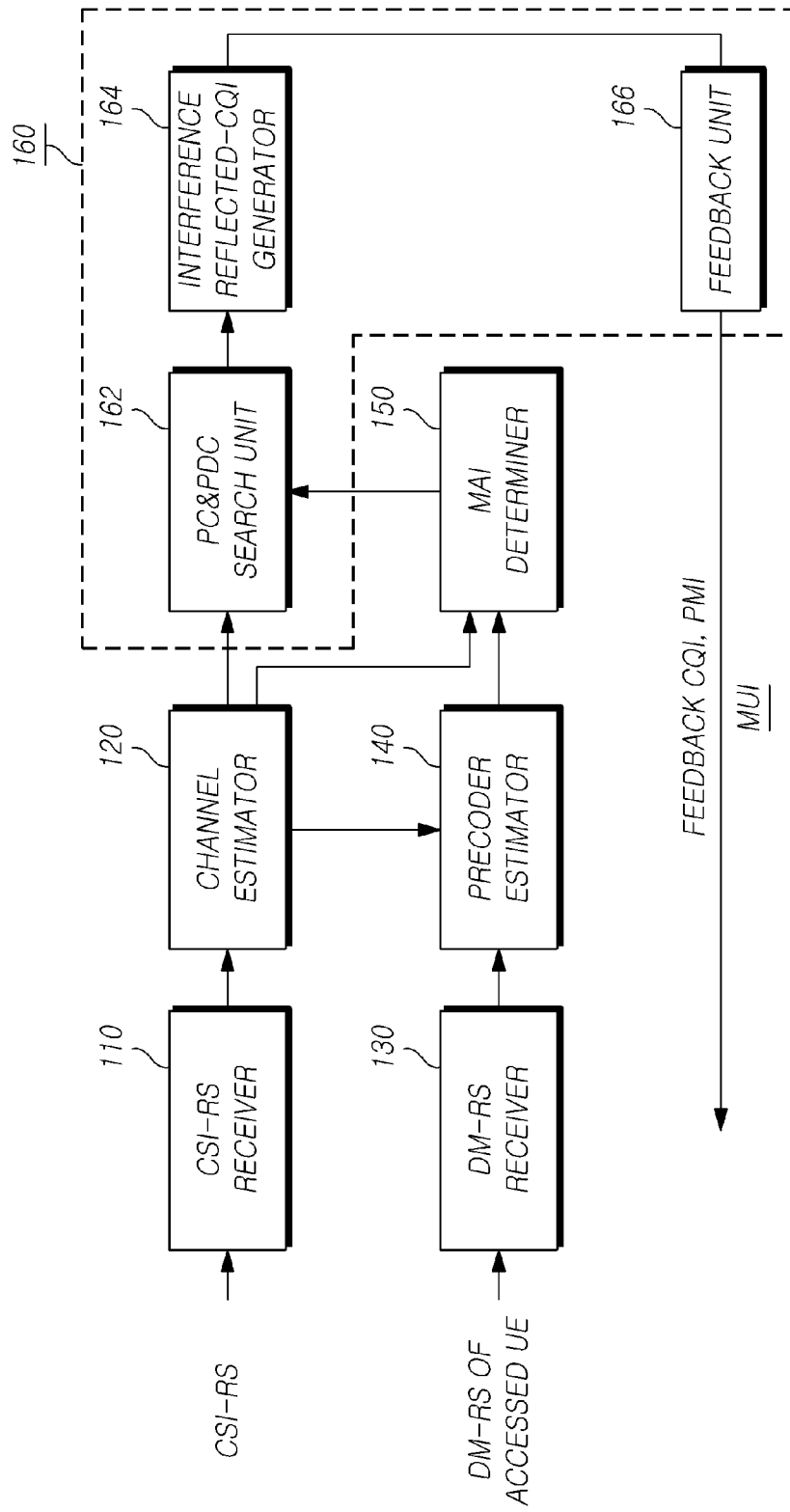
FIG. 3 is a block diagram of a channel information feedback apparatus for each function according to an embodiment of the present invention.

FIG. 3 is a block diagram of a channel information feedback apparatus for each function according to an embodiment of the present invention.

An MU-MIMO channel information feedback apparatus may be implemented in hardware or software within a pre-accessed UE currently in an access state or an additional UE attempting an additional access, but the MU-MIMO channel information feedback apparatus of the present invention is not limited thereto and it may be implemented in the BS, etc.

The MU-MEMO channel information feedback apparatus according to the embodiment of the present invention refers to an apparatus for feeding back channel information to the BS connected with one or more UEs, and has a configuration of generating and feeding back channel state information considering inter-UE interference according to an access of an additional UE.

That is, the MU-MIMO channel information feedback apparatus has a basic configuration of determining a degree of interference with the existing UE and transferring in advance an amount of interference or information on whether the MU-MEMO access is possible to the BS based on the degree of interference when there is an attempt of an access of each UE.

Referring to a specific configuration, the MU-MIMO channel information feedback apparatus 100 according to the embodiment of the present invention largely includes a CSI-RS receiver 110 for receiving a CSI-RS from the BS, a channel estimator 120 for estimating a channel by using the received CSI-RS, a DM-RS receiver 130 for receiving a DM-RS of an addition UE to be accessed, a precoder estimator 140 for estimating a type of a precoder (PC) of the corresponding additionally accessed UE based on the received DM-RS of the additional UE to be accessed and a channel estimation result by the channel estimator, an MAI determiner 150 for determining Multiple Access Interference (hereinafter, referred to as "MAI") based on information on the precoder of another accessed UE estimated by the precoder estimator and the channel estimation result by the channel estimator, and state information generating/transmitting unit 160 for generating channel state information, which reflects interference generated due to an accessed additional UE according to the MAI and feeding back the channel state information.

Further, the state information generating/transmitting unit 160 may include a PC-PDC search unit 162 for searching for an optimal precoder and post-decoder based on the channel estimation result by the channel estimator and the MAI determined by the MAI determiner, an interference-reflecting CQI generator 164 for generating a CQI reflecting interference based on information on the optimal precoder and post-decoder determined by the PC-PDC search unit, and a feedback unit 166 for feeding back channel state information, which may be generated due to interference.

The CSI-RS receiver 110 and the channel estimator 120 may be implemented separately or in combination. Although it has been described that the DM-RS receiver 130 and the precoder estimator 140 are implemented separately, they can be implemented in combination according to cases.

The DM-RS refers to a cell-specific reference signal for informing of a type of a precoder used for transmitting information to the UE by the BS. The UE can know a type of the precoder used for transmitting information to each UE by the BS by receiving and measuring the DM-RS.

Further, channel state information, which may be generated due to interference, fed back by the feedback unit 166 may be one or more of a basic CQI/PMI value, which does not reflect interference, an interference-reflecting CQI/PMI value, which reflects interference generated due to an access of an additional UE, and information on whether multiple accesses are possible, which indicates whether the access of the additional UE is possible, but the channel state information of the present invention is not limited thereto.

Furthermore, the information on whether the multiple accesses are possible may be an MUI (Multiple Access(ible) Index), and the MUI may be a flag signal of bits in one or more figures.

Hereinafter, a detailed block construction of the channel information feedback apparatus 100 of FIG. 3 will be described in detail.

Since the CSI-RS receiver 110 receives a cell-specific CSI-RS and has information on a band (subcarrier) and a symbol of a received signal, which receive the CSI-RS, the CSI-RS receiver 110 can measure a CSI-RS reception value by determining a signal of the time-frequency domain.

The channel estimator 120 performs a function of estimating a channel by using the received CSI-RS, and the channel estimation is performed as follows.

A reception value of the CSI-RS received by the CSI-RS receiver 110 is as defined in equation (1). In equation (1), $\bar{r}^{RS}$ denotes a reception value of a received CSI-RS, H denotes a propagation channel, $\bar{t}^{RS}$ denotes a transmission value of a transmitted CSI-RS, and $\bar{\eta}$ denotes a Gaussian noise.

$$\bar{r}^{RS} = H\bar{t}^{RS} + \bar{\eta} \quad (1)$$

In equation (1), since the reception value $\bar{r}^{RS}$ of the received CSI-RS can be known by the above measurement and the transmission value $\bar{t}^{RS}$ of the transmitted CSI-RS is an already known value between the BS and the UE, the propagation channel H can be estimated using a typical channel estimation scheme.

The DM-RS receiver 130 performs a function of receiving a DM-RS of another accessed UE, and a DM-RS used in a communication system such as LTE-A (Long Term Evolution-Advanced), etc. is generated through a sequence and a pattern having a regular rule.

Accordingly, if the UE knows the DM-RS sequence and pattern generating rule in advance, the UE can receive a transmitted DM-RS, which has been transferred to another user or another UE, as well as a DM-RS transmitted to the UE itself.

According to the current discussion, in a case where there are several layers, DM-RSs of respective layers are designed to be orthogonal to each other for the accurate measurement of DM-RSs between the layers, and all UEs can acquire information on a sequence generating method for generating the DM-RSs of the respective layers.

In general, the layer means an independent information stream, which has different information but is simultaneously transmitted, and the rank means the number of layers or the maximum number of layers which can be simultaneously transmitted.

Accordingly, each UE can receive and measure the transmitted DM-RS, which has been transferred to another user or another UE, through the same method as the method of measuring the DM-RS of the UE itself. A detailed operation is as follows.

First, the UE acquires information on a DM-RS of each layer according to a pattern by which the DM-RS of each layer is transmitted. Next, a correlation operation for a sequence corresponding to an acquired signal is performed and thus a DM-RS value can be acquired.

Further, the UE distinguishes the DM-RS value of the layer received by the UE among DM-RS values acquired through information received from the BS in advance from a DM-RS value of a layer for another UE.

Therefore, each UE can acquire the DM-RS value for another UE as well as the DM-RS value for each UE itself.

Next, the precoder estimator 140 estimates a type of a precoder (PC) of another accessed UE based on the received DM-RS of another accessed UE and the channel estimation result estimated by the channel estimator 120.

The DM-RS is a reference signal used for the precoder estimation, so that a precoder structure can be estimated by comparing the reception value of the DM-RS, the transmission value of the DM-RS, and the channel estimation value.

Specifically, a DM-RS reception value for an $n^{th}$ layer acquired through the correlation operation of the DM-RS sequence is defined by equation (2).

$$\bar{r}_n^{DM} = HC_n\bar{t}_n^{DM} + \bar{\eta} \quad (2)$$

In equation (2), $\bar{r}_n^{DM}$ denotes a DM-RS reception value for an $n^{th}$ layer acquired through the sequence correlation, $C_n$ denotes precoder information used for the precoding of a layer corresponding to the corresponding DM-RS, $\bar{t}_n^{D}$ denotes a DM-RS transmission value for the $n^{th}$ layer, and H denotes a propagation channel of a channel estimation value.

In equation (2), can be acquired through the aforementioned CSI-RS measurement, and the precoder information $C_n$ used for the precoding of the DM-RS of the $n^{th}$ layer can be estimated because the DM-RS transmission value $\bar{t}_n^{D}$ for the $n^{th}$ layer is already known through the measurement of the DM-RS reception value $\bar{r}_n^{DM}$ for the $n^{th}$ layer acquired through the sequence correlation.

Next, the MAI determiner 150 performs a function of determining MAI before post-decoding based on the precoder information $C_n$ of another accessed UE estimated by the precoder estimator and a channel estimation value H estimated by the channel estimator.

An MAI value, which the UE itself receives by a currently accessed UE or another UE to access later, is determined by values estimated in the block and equation (3).

$$\bar{r}_n^{D} = HC_n\bar{t}_n^{D} + \bar{\eta} \quad (3)$$

In equation (3), $\bar{r}_n^{D}$ denotes a data reception value of the $n^{th}$ layer allocated to another UE and also simultaneously denotes an interference value (MAI) generated by an access of another UE in an aspect of the corresponding UE itself.

In equation (3), $\bar{t}_n^{D}$ denotes a data transmission value transmitted in the $n^{th}$ layer allocated to another UE, $\bar{\eta}$ denotes a Gaussian noise, $C_n$ denotes precoder information used for the precoding of the corresponding $n^{th}$ layer, and H denotes a propagation channel of a channel estimation value.

In equation (3), $C_n$, H and the like are acquired in a previous block, and $\bar{r}_n^{D}$, which is the interference value (MAI) generated according to the access of another UE, can be acquired by the data transmission value $\bar{t}_n^{D}$ transmitted in the $n^{th}$ layer allocated to another UE.

The PC-PDC search unit 162 searches for an optimal precoder and post-decoder based on the channel estimation result estimated by the channel estimator and the MAI determined by the MAI determiner, and can determine an optimal precoding method or precoder (PC), and an optimal post-decoding method or post-decoder (PDC) by using various precoding schemes because the PD-PDC search unit 162 can know a reception value and interference of a required signal.

For example, as defined in 3GPP LTE, the optimal precoder and post-decoder can be determined through searching a precoder codebook, but the determination of the present invention is not limited thereto and another precoding design scheme can be used.

The interference-reflecting CQI generator 164 generates an interference-reflecting CQI based on information on the optimal precoder and post-decoder determined by the PC-PDC search unit 162. At this time, a construction identical to a general CQI determining method (i.e. a method not considering MU-MIMO interference) can be used.

For example, a CQI index in a case where an already determined optimal PC and PDC are adopted based on a 4 bit CQI table as shown in Table 1 can be selected, but the present invention is not limited thereto.

TABLE 1

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Further, although not illustrated, the channel information feedback apparatus 100 of FIG. 3 may further include an interference-reflecting PMI generator for generating a PMI reflecting interference, which indicates an optimal precoding matrix in a case where there is interference, based on the optimal precoder and post-decoder determined by the PC-PDC search unit 160.

The CQI indicates a downlink channel state, and may include a PMI (Precoding Matrix Index) corresponding to an index of a precoding matrix on a codebook and/or a CQI index indicating each entity of an MCS (Modulation and Coding Scheme) table including a plurality of entities consisting of a combination of encoding rates and modulation schemes.

Further, Channel State Information (CSI) of which the UE informs the BS in a multiple antenna system may include the PMI and a Rank Indicator (RI) indicating the number of independent channels as well as the CQI. In general, the channel state information can be periodically or aperiodically fed back to the BS through a Physical Uplink Control Channel (PUCCH) and/or a Physical Uplink Shared Channel (PUSCH).

Meanwhile, the channel information feedback apparatus 100 of FIG. 3 can additionally generate a basic CQI value and a basic PMI value corresponding to a general CQI value and a general PMI value, which do not reflect interference generated due to the additionally accessed UE, selectively through the operation as shown in FIG. 2.

The feedback unit 166 of the channel information feedback apparatus 100 of FIG. 3 performs a function of feeding back channel state information, which may be generated by interference, to the BS.

The channel state information, which may be generated by the interference, may be one or more of the basic CQI value and the basic PMI value, which do not reflect interference, the CQI value and the PMI value, which reflect the generated interference, and information on whether a multiple access is possible. Further, the information on whether the multiple access is possible may be an MUI (Multiple Access(ible) Index) including bits in a single figure, but the information of the present invention is not limited thereto.

Accordingly, the CQI used herein may be a concept including all of the PMI, the RI, the MUI, etc., and, in this case, it is not required to separately construct the aforementioned PMI generator.

The feedback unit 166 performs a function of feeding back the channel state information generated by interference to the BS. At this time, there are three feedback algorithms adapted by the feedback unit, but the feedback algorithm of the present invention is not limited thereto.

First feedback scheme: Two CQI/PMI feedback

A first feedback scheme corresponds to a scheme of feeding back all of the CQI and/or PMI values corresponding to the CQI and/or PMI in a case where there is no MAI (i.e. interference) obtained as described above and the interference-reflecting CQI and/or PMI values corresponding to the CQI and/or PMI reflecting interference to be generated due to an access of an additional UE to the BS as channel state information, which may be generated by interference.

That is, both the general CQI/PMI value without interference and the interference-reflecting CQI/PMI value are fed back.

The BS having received the values can perform the switching between the SU-MIMO and the MU-MIMO by comparing advantages of cases where there is an access of an additional UE and there is not access of the additional UE or cases of operating with the MU-MIMO and the SU-MIMO. When the system is operated in an MU-MIMO mode, it can be determined whether each UE is accessible.

Second feedback scheme: MUI & single CQI/PMI

Each UE has a required CQI which is a CQI value required for successfully supplying a service. For example, a low required CQI is enough for voice communication, and a very high required CQI is needed for viewing an HD movie.

As described above, since the UE can acquire both the interference-reflecting CQI in a case of being operated in the MU-MIMO mode due to an access of an additional UE and the general CQI in a case of being operated in a current mode (SU-MIMO or MU-MIMO), if the UE satisfies a required CQI by comparing the required CQI and the two CQIs even though the UE is operated in the MU-MIMO due to the access of the additional UE, the UE feeds back the interference-reflecting CQI and/or an interference-reflecting PMI according to the access of the additional UE together with the signaling informing that the additional UE is accessible.

If the interference-reflecting CQI value in a case where there is the access of the additional UE does not satisfy the required CQI, the UE transmits the general PMI and the general CQI corresponding to the CQI in a state where there is no access of the additional UE, that is, in the current state, together with the signaling informing that the additional UE is inaccessible.

At this time, the aforementioned MUI can be used for signaling whether the additional UE is accessible. For example, when the additional UE is accessible, an MUI flag is set to "1" and then transmitted. When the additional UE is inaccessible, the MUI flag is set to "0" and then transmitted.

Third feedback scheme: Maximum throughput case

A third feedback scheme corresponds to a case where there is no required CQI needed by each UE and there is a non-real time traffic requiring a best throughput. The third feedback scheme can be implemented in the following two schemes.

In a first scheme (3-1 feedback scheme), the first feedback scheme or the second feedback scheme is applied according to whether there is a minimum requirement of the UE. That is, when there is the minimum requirement of the UE, the second feedback scheme is operated by comparing the minimum requirement and the CQI in the MU-MIMO mode due to the access of the additional UE, that is, the interference-reflecting CQI value. When there is no minimum requirement of the UE, the first feedback scheme in which both the CQI value and the PMI value are fed back is operated.

In a second scheme (3-2 feedback scheme), it is identified whether a difference between the basic CQI value and the interference-reflecting CQI value according to whether there is the access of the additional UE is larger than a predetermined threshold (Th). When the difference is larger than the threshold, the basic CQI is fed back. When the difference is smaller than the threshold, the interference-reflecting CQI is fed back.

That is, when the difference between the basic CQI value and the interference-reflecting CQI is larger than the threshold, it is recognized that a channel environment becomes worse due to the access of the additional UE and thus the basic CQI value is fed back. When the difference is smaller than the threshold, it means that an effect of the access of the additional UE is low and thus the interference-reflecting CQI value is fed back.

The BS apparatus according to an embodiment of the present invention is a BS apparatus for switching a mode according to an access of an additional UE in a state where the BS apparatus is connected to one or more pre-accessed UEs. The BS apparatus receives a feedback of channel state information according to the access of the additional UE from the pre-accessed UE or the additional UE to be accessed, determines whether the additional UE to be accessed is accessible based on the received feedback of the channel state information, and performs a mode switching operation according to the determination.

More specifically, the BS having received the channel state information according to the access of the additional UE, that is, the basic CQI value, the basic PMI value, the generated interference-reflecting CQI and PMI, and information on whether a multiple access is possible determines whether the additional UE is accessible based on the algorithm determined according to the aforementioned feedback schemes and performs the mode switching operation according to the determination.

For example, based on an assumption that a UE2 makes a request for an additional access in the SU-MIMO where a UE1 is currently accessed, if there is a required CQI corresponding to the minimum requirement for the UE1, the UE1 or the UE2 acquires the interference-reflecting CQI due to the access of the UE2 according to the aforementioned second feedback scheme, compares the acquired interference-reflecting CQI with the required CQI, and then feeds back the MUI and the basic CQI or the interference-reflecting CQI. Then, the BS allows the access of the UE2 and performs the mode switching to the MU-MIMO mode when the MUI flag is set to "1". Otherwise, the BS maintains the SU-MIMO mode.

Although it has been mainly described that the switching between the SU-MIMO mode and the MU-MIMO mode is carried out in a case in which the SU-MIMO mode where there is one UE currently accessed is switched to the MU-MIMO mode, the present invention may be applied to a case where an MU-MIMO where there are accesses of N (>2) UEs is switched to another MU-MIMO where there are access of N+1 UEs.

Figure 4:
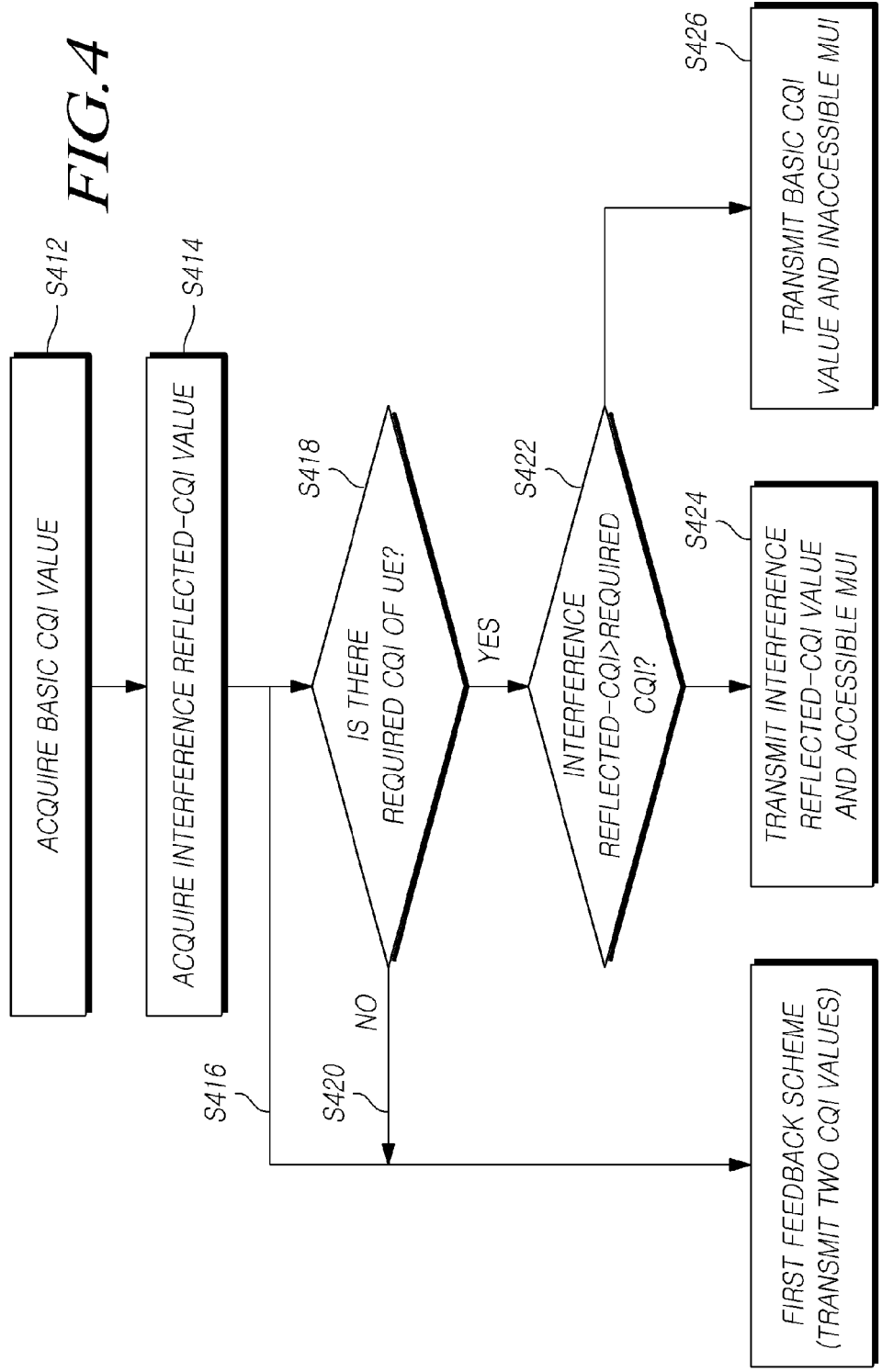
FIGS. 4 and 5 are flowcharts of a feedback algorithm performed by the channel information feedback apparatus according to the embodiment of the present invention.
Figure 5:
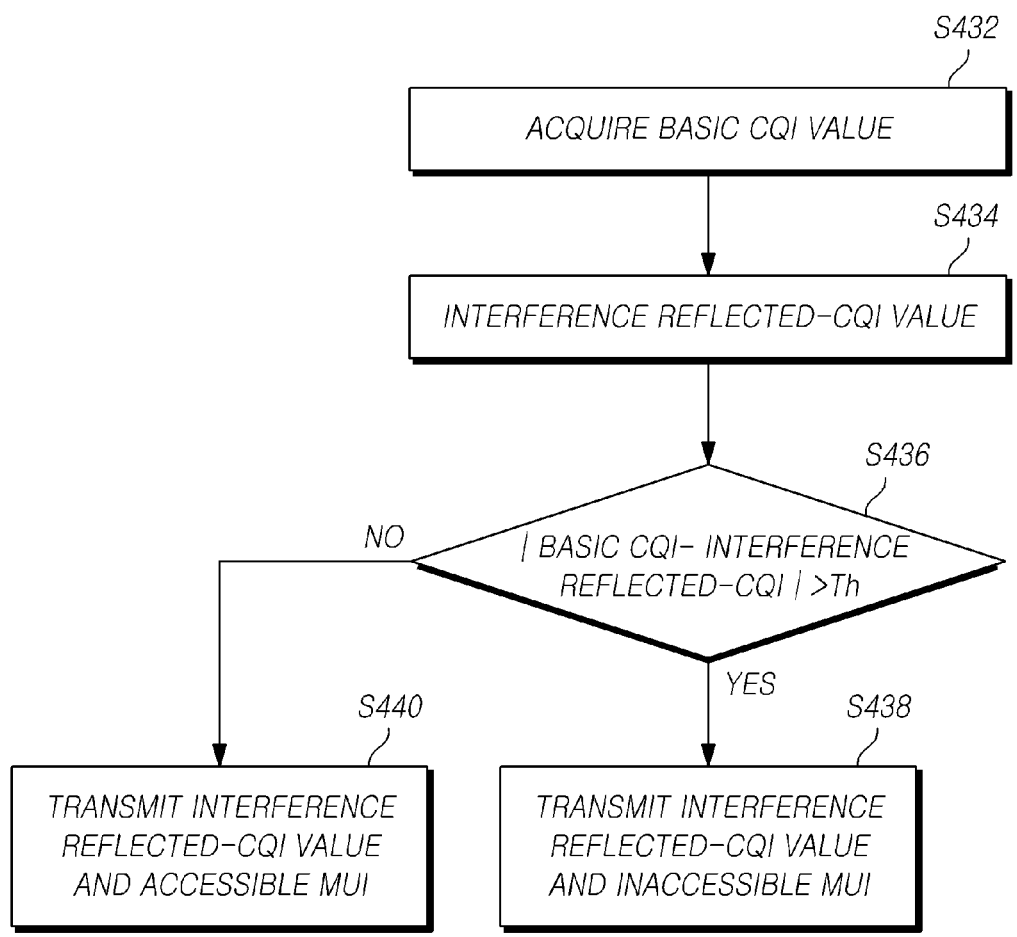

FIGS. 4 and 5 are flowcharts of a feedback algorithm performed by the channel information feedback apparatus according to embodiments of the present invention.

FIG. 4 collectively illustrates a first feedback algorithm, a second feedback algorithm, and a 3-1 feedback algorithm, but only a part of the above algorithms may be implemented as described above.

First, the UE acquires the basic CQI/PMI value corresponding to the CQI in the current state where there is no access of the additional UE through the operation as shown in FIG. 2 in step S412. Next, the UE acquires the interference-reflecting CQI/PMI value corresponding to the CQI in a case where there is the access of the additional UE by using the channel information feedback apparatus shown in FIG. 3 in step S414.

Thereafter, the UE feeds back both the CQI/PMI values to the BS without an additional operation based on the first feedback algorithm in step S416, and identifies whether the required CQI corresponding to the minimum requirement for the currently accessed UE or the UE to be additionally accessed is set according to the 3-1 feedback scheme in step S418. When there is no required CQI, the UE feeds back the acquired two CQI/PMI values to the BS in step S420.

Meanwhile, based on the second feedback algorithm, the required CQI corresponding to the minimum requirement for the currently accessed UE or the UE to be additionally accessed is set. The UE determines whether the acquired interference-reflecting CQI value is larger than the required CQI value in step S422. When the acquired interference-reflecting CQI value is larger than the required CQI value, the UE feeds back the MUI of the accessible flag and the interference-reflecting CQI value in step S424. When the acquired interference-reflecting CQI value is smaller than the required CQI value, the UE feeds back the MUI of the inaccessible flag and the basic CQI value in step S426.

FIG. 5 is a flowchart of a 3-2 feedback algorithm.

First, like FIG. 4, the UE acquires the basic CQI/PMI value corresponding to the CQI in the current state where there is no access of the additional UE through the operation as shown in FIG. 2 in step S432. Next, the UE acquires the interference-reflecting CQI/PMI value corresponding to the CQI in a case where there is the access of the additional UE by using the channel information feedback apparatus shown in FIG. 3 in step S434.

Thereafter, the UE determines whether a difference between the basic CQI value and the interference-reflecting CQI value is larger than the predetermined threshold (Th) in step S436.

When the difference between the basic CQI value and the interference-reflecting CQI value is larger than the threshold, the UE recognizes that the channel environment becomes worse due to the access of the additional UE and feeds back the basic CQI value in step S438. When the difference between the basic CQI value and the interference-reflecting CQI value is smaller than the threshold, it means that an effect of the access of the additional UE is low and thus the UE feeds back the interference-reflecting CQI value in step S440.

The aforementioned embodiments can be mainly applied to a downlink MIMO system. Specifically, the embodiments can be applied to all downlink MIMO systems such as a Coordinated Multi-Point transmission/reception system (CoMP), a heterogeneous network, etc. as well as a single cell environment.

As described above, according to embodiments of the present invention, when the access of the additional UE is requested in an SU-MIMO or MU-MIMO environment, the mode switching between the SU-MIMO and the MU-MIMO is provided by either allowing or not allowing the access of the additional UE after channel state information reflecting interference according to the access of the additional UE is obtained. As a result, it is possible to efficiently support the MU-MIMO.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardwares. Codes and code segments forming the computer program can be easily conceived by an ordinarily skilled person in the technical field of the present invention. Such a computer program may implement the embodiments of the present invention by being stored in a computer readable storage medium, and being read and executed by a computer. A magnetic recording medium, an optical recording medium, a carrier wave medium, or the like may be employed as the storage medium.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

The invention claimed is:

1. An apparatus for feeding back channel information to a Base Station (BS) connected to one or more User Equipments (UEs), the apparatus generating and feeding back channel state information considering inter-UE interference due to an access of an additional UE, the apparatus comprising:
   a Channel Status Index-Reference Signal (CSI-RS) receiver for receiving a CSI-RS from the BS;
   a channel estimator for estimating a channel by using the received CSI-RS;
   a Demodulation Reference Signal (DM-RS) receiver for receiving a DM-RS of the additional UE;
   a precoder estimator for estimating a type of a precoder (PC) of the corresponding additional UE based on the received DM-RS of the additional UE and a channel estimation result by the channel estimator;
   an MAI (Multiple Access Interference) determiner for determining MAI based on information on the precoder of the additional UE estimated by the precoder estimator and the channel estimation result by the channel estimator; and
   a state information generating/transmitting unit for generating and feeding back channel state information reflecting interference generated due to the additional UE according to the MAI.

2. The apparatus as claimed in claim 1, wherein the state information generating/transmitting unit comprises:
   a Pre-Coding-Post Decoding (PC-PDC) search unit for searching for an optimal precoder and post-decoder based on the channel estimation result by the channel estimator and the MAI determined by the MAI determiner;
   an interference-reflecting Channel Quality Indicator (CQI) generator for generating a CQI reflecting interference based on information on the optimal precoder and post-decoder determined by the PC-PDC search unit; and
   a feedback unit for feeding back channel state information which may be generated due to interference.

3. The apparatus as claimed in claim 1, wherein the channel state information considering the inter-UE interference contains one or more of a basic CQI value corresponding to a CQI in a current state without the additional UE, an interference-reflecting CQI value corresponding to a CQI in a case where there is the access of the additional UE, and an MUI (Multiple Access(ible) Index) indicating whether the additional UE is accessible.

4. The apparatus as claimed in claim 3, wherein the channel information feedback apparatus feedbacks an acquired basic CQI value and interference-reflecting CQI value together.

5. The apparatus as claimed in claim 3, wherein the channel information feedback apparatus compares the interference-reflecting CQI value with a required CQI value of a currently accessed UE or the additional UE, and selectively feeds back the MUI together with the basic CQI value or the interference-reflecting CQI value according to the comparison.

6. The apparatus as claimed in claim 3, wherein the channel information feedback apparatus determines whether a difference between the interference-reflecting CQI value and the basic CQI value is equal to or larger than a specific threshold, and feeds back the basic CQI value or the interference-reflecting CQI value according to the determination.

7. A Base Station (BS) apparatus for switching a mode according to an access of an additional User Equipment (UE) in a state where the BS apparatus is connected to one or more pre-accessed UEs, the BS apparatus receiving a feedback of channel state information according to the access of the additional UE from the pre-accessed UE or the additional UE, determining whether the additional UE is accessible based on the received feedback of the channel state information, and performing a mode switching operation according to the determination.

8. A BS apparatus as claimed in claim 7, wherein the channel state information according to the access of the additional UE contains one or more of a basic Channel Quality Indicator (CQI) value corresponding to a CQI in a current state without the additional UE, an interference-reflecting CQI value corresponding to a CQI in a case where there is the access of the additional UE, and an MUI (Multiple Access (ible) Index) indicating whether the additional UE is accessible.

9. A communication terminal apparatus for feeding back channel information to a Base Station (BS), the communication terminal apparatus generating and feeding back channel state information considering inter-User Equipment (inter-UE) interference according to an access of an additional UE,
wherein the channel state information considering the inter-UE interference contains one or more of a basic Channel Quality Indicator (CQI) value corresponding to a CQI in a current state without the additional UE, an interference-reflecting CQI value corresponding to a CQI in a case where there is the access of the additional UE, and an MUI (Multiple Access(ible) Index) indicating whether the additional UE is accessible.

10. A method of feeding back channel information to a Base Station (BS) connected to one or more User Equipments (UEs), the method comprising:
acquiring a basic Channel Quality Indicator/Precoding Matrix Index (CQI/PMI) value corresponding to a CQI in a current state without an access of an additional UE;
acquiring an interference CQI/PMI value corresponding to a CQI in a case where there is the access of the additional UE; and
transmitting the acquired basic CQI/PMI value and interference-reflecting CQI/PMI value to the BS,
wherein the acquired basic CQI/PMI value and interference-reflecting CQI/PMI value are transmitted to the BS only when a required CQI corresponding to a minimum requirement for a currently accessed UE or a UE to be additionally accessed is not set.

11. A method of feeding back channel information to a BS connected to one or more User Equipments (UEs), the method comprising:
acquiring a basic Channel Quality Indicator/Precoding Matrix Index (CQI/PMI) value corresponding to a CQI in a current state without an access of an additional UE;
acquiring an interference-reflecting CQI/PMI value corresponding to a CQI in a case where there is the access of the additional UE; and
feeding back an Multiple Access(ible) Index (MUI) of an accessible flag and the interference-reflecting CQI value when a required CQI corresponding to a minimum requirement for a currently accessed UE or a UE to be additionally accessed is set and the interference-reflecting CQI value is larger than a required CQI value, and feeding back an MUI of an inaccessible flag and the basic CQI value when the interference-reflecting CQI value is smaller than a required CQI value.

12. A method of feeding back channel information to a Base Station (BS) connected to one or more User Equipments (UEs), the method comprising:
acquiring a basic Channel Quality Indicator/Precoding Matrix Index (CQI/PMI) value corresponding to a CQI in a current state without an access of an additional UE;
acquiring an interference-reflecting CQI/PMI value corresponding to a CQI in a case where there is the access of the additional UE; and
determining whether a difference between the basic CQI value and the interference-reflecting CQI value is equal to or larger than a predetermined threshold (Th), and feeding back the basic CQI value when the difference between the basic CQI value and the interference-reflecting CQI value is larger than the threshold and feeding back the interference-reflecting CQI value when the difference between the basic CQI value and the interference-reflecting CQI value is smaller than the threshold.

13. A method of switching a mode according to an access of an additional User Equipment (UE) in a state where there are accesses of one or more pre-accessed UEs, the method comprising:
receiving a feedback of channel state information according to the access of the additional UE from the pre-accessed UE or the additional UE; and
determining whether the additional UE is accessible based on the received feedback of the channel state information and performing a mode switching operation according to the determination.

* * * * *